United States Patent [19]

Wichmann

[11] 4,297,606

[45] Oct. 27, 1981

[54] METHOD OF BRACING END TURNS OF AN ELECTRIC MACHINE BY MEANS OF A BINDING BAND; AND DEVICE USED THEREIN

[75] Inventor: Arnold Wichmann, Mulheim an der Ruhr, Fed. Rep. of Germany

[73] Assignee: Kraftwerk Union Aktiengesellschaft, Mulheim an der Ruhr, Fed. Rep. of Germany

[21] Appl. No.: 889,003

[22] Filed: Mar. 22, 1978

[30] Foreign Application Priority Data

Mar. 29, 1977 [DE] Fed. Rep. of Germany ....... 2713847

[51] Int. Cl.³ .......................................... H02K 3/48
[52] U.S. Cl. .................................... 310/271; 310/45; 310/260; 310/270; 174/138 E; 336/207
[58] Field of Search ................. 310/260, 270, 271, 45, 310/217, 218, 262; 174/138 E; 336/197, 207

[56] References Cited

U.S. PATENT DOCUMENTS

| 2,994,735 | 8/1961 | Marshall | 174/138 E |
| 3,135,888 | 6/1964 | Coggeshall | 336/197 |
| 3,330,978 | 7/1967 | Pettit | 310/271 |
| 3,437,859 | 4/1969 | Gibbs | 174/138 E |
| 3,999,157 | 12/1976 | Philofsky | 336/197 |

FOREIGN PATENT DOCUMENTS

2422019 11/1976 Fed. Rep. of Germany ...... 310/271

*Primary Examiner*—R. Skudy
*Attorney, Agent, or Firm*—Herbert L. Lerner

[57] ABSTRACT

Method of bracing winding end turns of an electric machine includes wrapping a first binding tape transversely around a pair of winding bars forming the end turns and disposed spaced from and substantially parallel to one another, wrapping a second binding tape transversely about the wrapped first binding tape in the space between the pair of winding bars so that the wrapped first and second binding tapes and the mutually opposing surfaces of the parallel winding bars define an inner space within, and injecting a flowable, cold hardenable cement mass into the inner space, and introducing into the space between the winding bars at the location of the inner space subsequently defined by the wrapped first and second binding tapes and the winding bars, and before injecting the cement mass into the inner space, a spacer member defining and predetermining the spacing between the pair of winding bars and having a shape that affords penetration of the cement mass from a given point of injection to all of the spaces and surfaces defining the last-mentioned spaces within the interior space defined by the wrapped first and second binding tapes and the pair of winding bars; and device therein.

4 Claims, 4 Drawing Figures

METHOD OF BRACING END TURNS OF AN ELECTRIC MACHINE BY MEANS OF A BINDING BAND; AND DEVICE USED THEREIN

The invention relates to a method of bracing or reinforcing winding end turns of an electric machine by means of a wrapping or binding band looped or wrapped transversely around the winding bars and a further wrapping or binding band which is disposed transversely to the first-mentioned wrapping and covers the latter in the space between the winding bars, so that the two wrappings, together with the winding bars, define an inner space which is injected with a flowable, cold hardenable cement.

Such a method has become known heretofore from German Published Non-Prosecuted Application DT-OS No. 2,422,019. In this known method, a spacer member is inserted between the winding bars outside the inner space defined by the wrappings and the winding bars so as to space the winding bars from one another accurately before the defined inner space is filled; after the defined inner space is injected with cement, the spacer member is removed. With this known method, there exists the danger that the cement will shrink as it hardens, which can lead to the formation of cracks or crevices therein and thereby produce a change in the mutual spacing of the winding bars.

It is therefore an object of the invention to provide an improved device and method for bracing or reinforcing end turns of an electric machine by means of a bracing band or wrapping of the generally heretofore-known type wherein shrinkage of the cement during hardening thereof remains without any effect upon the predetermined spacing of the winding bars that are to be braced or reinforced.

With the foregoing and other objects in view, there is provided, in accordance with the invention, in a method of bracing winding end turns of an electric machine which includes wrapping a first binding tape transversely around a pair of winding bars forming the end turns and disposed spaced from and substantially parallel to one another, wrapping a second binding tape transversely about the wrapped first binding tape in the space between the pair of winding bars so that the wrapped first and second binding tapes and the mutually opposing surfaces of the parallel winding bars define an inner space therewithin, and injecting a flowable, cold hardenable cement mass into the inner space, additionally introducing into the space between the winding bars at the location of the inner space subsequently defined by the wrapped first and second binding tapes and the winding bars, and before injecting the cement mass into the inner space, a spacer member defining and predetermining the spacing between the pair of winding bars and having a shape that affords penetration of the cement mass from a given point of injection to all of the spaces and surfaces defining the last-mentioned spaces within the interior space defined by the wrapped first and second binding tapes and the pair of winding bars.

Further in accordance with the invention, there are provided in a device for bracing winding end turns of an electric machine wherein a pair of winding bars forming the end turns are disposed spaced from and substantially parallel to one another, a spacer member disposed between the winding bars and defining and predetermining the spacing between the pair of winding bars, a first binding tape wrapped transversely around the pair of winding bars at the location of the spacer member, a second binding tape wrapped transversely about the wrapped first binding tape in the space between the pair of winding bars, the wrapped first and second binding tapes and mutually opposing surfaces of the parallel winding bars defining an inner space therewithin wherein the spacer member is disposed, and a cold hardened, flowable-type cement mass injectedly received in the inner space, the spacer member having a shape affording penetration by the flowable-type cement from a given injection point to every part of the inner space unoccupied by the spacer member and to all surfaces defining the unoccupied part of the inner space.

In accordance with another feature of the invention, the spacer member comprises a substantially prismatic or parallelepipedal body formed with at least one lateral recess providing a passageway for penetration by a flowing cement mass from one side to another of the body.

In accordance with an added feature of the invention, the body is U-shaped and has opposite U-shaped faces for engagement with the respective winding bars.

In accordance with an additional feature of the invention, the body is I-shaped.

In accordance with a concomitant feature of the invention, the spacer member comprises a substantially prismatic or parallelepipedal body formed with a plurality of substantially parallel grooves disposed on a first pair of opposite sides thereof and providing passageways for penetration by a flowing cement mass from one side of a second pair of opposite sides of the body disposed transversely to the first pair thereof, to the other side of the second pair of sides.

Due to this spacer member, the entire inner space or cavity is then no longer fully injected; however, so many fillable cavaties or interior spaces remain under the wrappings, that a large-area contact between the surface of the bars and the spacer member is produced by the injected cement mass. Due to the method of injection or filling and the use of a fixed spacer member with simultaneous injection or filling in or the remaining inner spaces or cavaties, any possible consequent shrinkage during hardening of the cement will not result in the formation of gaps or cracks.

Other features which are considered as characteristic for the invention are set forth in the appended claims.

Although the invention is illustrated and described herein as embodied in a method of bracing end turns of an electric machine by means of a binding band; and device used therein, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
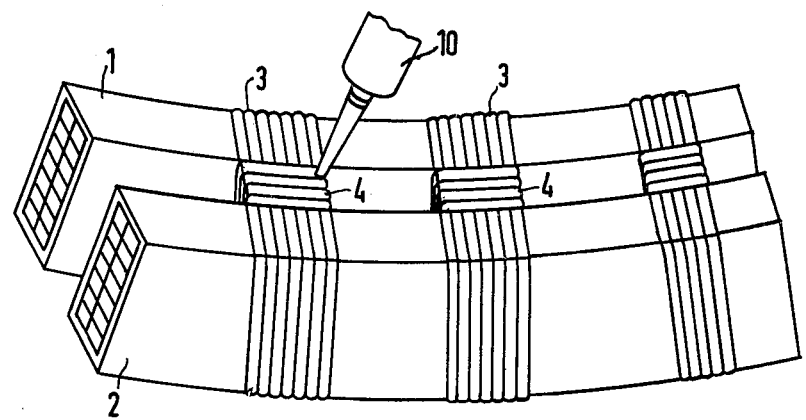
FIG. 1 is a perspective view of a section of two parallel winding bars of the end turn of an electric machine, the winding bars having fully wound wrappings or bracing bands thereon.

Referring now to the drawing and first, particularly, to FIG. 1 thereof, there are shown two substantially parallel bar sections 1 and 2 at an arbitrarily selected location within winding end turns of a stator winding. A wrapping or binding band 3 is first wound at the locations to be wrapped and is looped transversely around the two winding bars 1 and 2, the wrapping or binding band 3 being formed of flexible glass tubing or hose, fabric or textile tape or cord. A second wrapping or binding band or tape 4, which encloses or envelops the first wrapping 3, is wound transversely to the latter in the space intermediate the two bars 1 and 2, so that these wrappings 3 and 4 together with the two winding bars 1 and 2, define therewithin a cavity or inner space.

Figure 2:
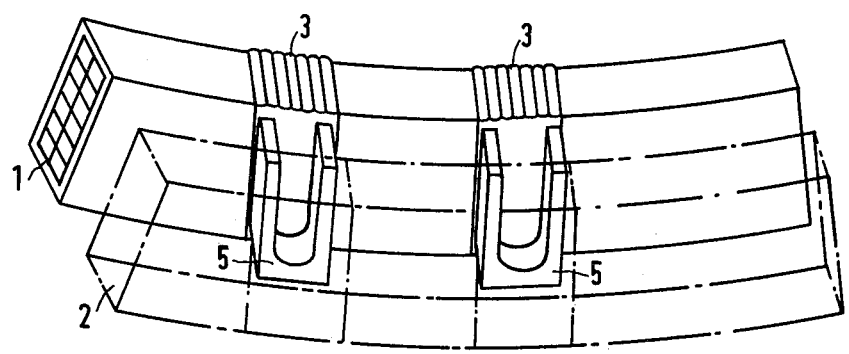
FIG. 2 is a view similar to that of FIG. 1 of the winding bars, however, the winding bar in the foreground is shown in phantom and the wrappings between the winding bars are omitted so as to expose the spacer members.

In order to space the bars 1 and 2 exactly and lastingly one from the other, suitable spacer members are inserted between the two bars 1 and 2 before the wrappings 3 and 4 are applied; as one possible embodiment of the invention, two U-shaped spacer members 5 are shown in FIG. 2. After these spacer members 5 have been inserted between the bars 1 and 2 and wrapped with the two wrappings 3 and 4, the remaining interior space or cavity thus formed within the wrappings 3 and 4 is injected by an injecting nozzle 10 shown diagrammatically in FIG. 1 with a mass of cement formed advantageously of polyester or epoxy resins, which harden at room temperature, and are provided with a filler.

Through the U-shaped construction of the spacer members 5 as illustrated in FIG. 2 i.e. by forming the basically prismatic spacer members with one or more lateral recesses, a large-area contact between the surface of the bars 1 and 2 and the spacer members 5 is provided, on the one hand, yet penetration of the cement from the point of injection to all of the surfaces within the cavity or inner space defined by the wrappings 3 and 4 and the lateral surfaces of the bars 1 and 2 is assured. After the cement has hardened, a firm bonding or compound structure of the bars 1 and 2 is produced, no gaps or crevices being formed within the cement mass which might otherwise alter the spacing between the bars 1 and 2, if the cement should shrink during the hardening process.

Figure 3:
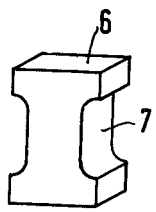
FIGS. 3 and 4 are perspective views of other advantageous forms of spacer members that can be used within the scope of the invention.

As is readily apparent from FIG. 3, a double-T or I-shaped spacer member 6 can also be inserted between the bars 1 and 2. The location at which the spacer members 6 are installed are immaterial, the lateral notches or cutouts 7 also affording free passage or penetration of the cement material from the point of injection to all of the surfaces within the cavity or interior space within the wrappings 3 and 4.

Figure 4:
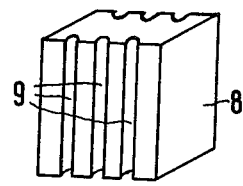

Another embodiment of the invention is shown in FIG. 4 wherein the spacer member 8 is basically prismatic and is formed on two opposite lateral surfaces thereof with parallel grooves 9, through which passage or penetration of the cement mass from the injection point is also reliably assured.

There are claimed:

1. In a device for bracing winding end turns of an electric machine wherein a pair of winding bars forming the end turns are disposed spaced from and substantially parallel to one another, a spacer member disposed between and contacting the winding bars and defining and predetermining the spacing between the pair of winding bars, a first binding tape wrapped transversely around the pair of winding bars at the location of said spacer member, a second binding tape wrapped transversely about the wrapped first binding tape in the space between the pair of winding bars, the wrapped first and second binding tapes and mutually opposing surfaces of the parallel winding bars defining a substantially closed inner space therewithin wherein said spacer member is disposed, and a cold hardened, flowable-type cement mass injectedly received in said inner space, said spacer member having a shape affording penetration by said flowable-type cement from a given injection point to every part of said inner space unoccupied by said spacer member and to all surfaces defining said unoccupied part of said inner space, said spacer member comprising a substantially parallelepipedal body formed with at least one lateral recess providing a passageway for penetration by a flowing cement mass from one side to another of said body.

2. Spacer member according to claim 1 wherein said body is U-shaped and has opposite U-shaped faces for engagement with the respective winding bars.

3. Spacer member according to claim 1 wherein said body is I-shaped.

4. Spacer member according to claim 1 wherein said body is formed with a plurality of substantially parallel grooves disposed on a first pair of opposite sides thereof and providing passageways for penetration by a flowing cement mass from one side of a second pair of opposite sides of said body disposed transversely to said first pair thereof, to the other side of said second pair of sides.

* * * * *